United States Patent [19]
Leisterer et al.

[11] 4,122,430
[45] Oct. 24, 1978

[54] SONAR SYSTEM

[75] Inventors: Reinhard Leisterer, Bremen; Dietrich Müller, Achim, both of Germany

[73] Assignee: Fried. Krupp Gesellschaft mit beschränkter Haftung, Essen, Germany

[21] Appl. No.: 174,958

[22] Filed: Aug. 25, 1971

[51] Int. Cl.² ..................... G01S 9/66; H04B 11/00
[52] U.S. Cl. ..................... 340/5 R; 340/3 A; 340/6 R
[58] Field of Search ............. 340/3 A, 3 R, 5 R, 6 R

[56] References Cited
U.S. PATENT DOCUMENTS 3,609,673   9/1971   Müller .................... 340/3 R

*Primary Examiner*—Richard A. Farley
*Attorney, Agent, or Firm*—Spencer & Kaye

[57] ABSTRACT

An improved sonar system of the type wherein a plurality of acoustical beams are transmitted with directional characteristics which are simultaneously swept over adjacent sectors of the observation area. The transmitting directional characteristics of each pair of adjacent sectors are swept or pivoted over their respectively associated sectors in a continuous manner and in opposite directions so that they leave and reach the common borderline between the sectors at the same instant of time.

7 Claims, 8 Drawing Figures

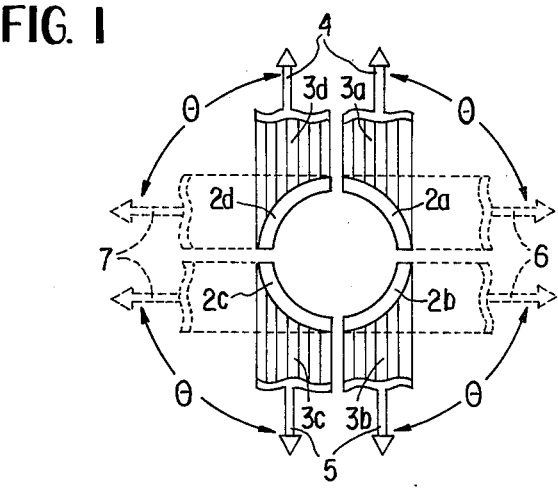
FIG. 1
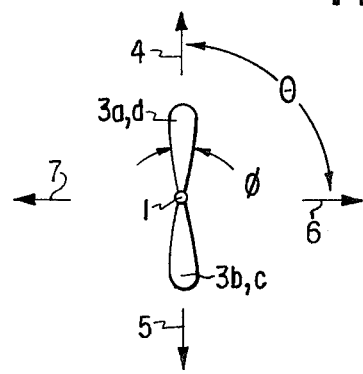
FIG. 2a
FIG. 2c  FIG. 2d  FIG. 2e
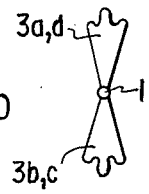
FIG. 2b
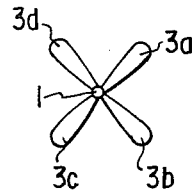
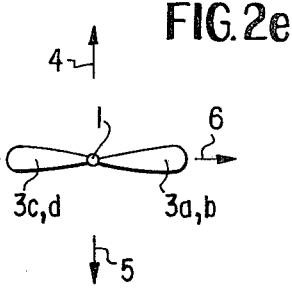
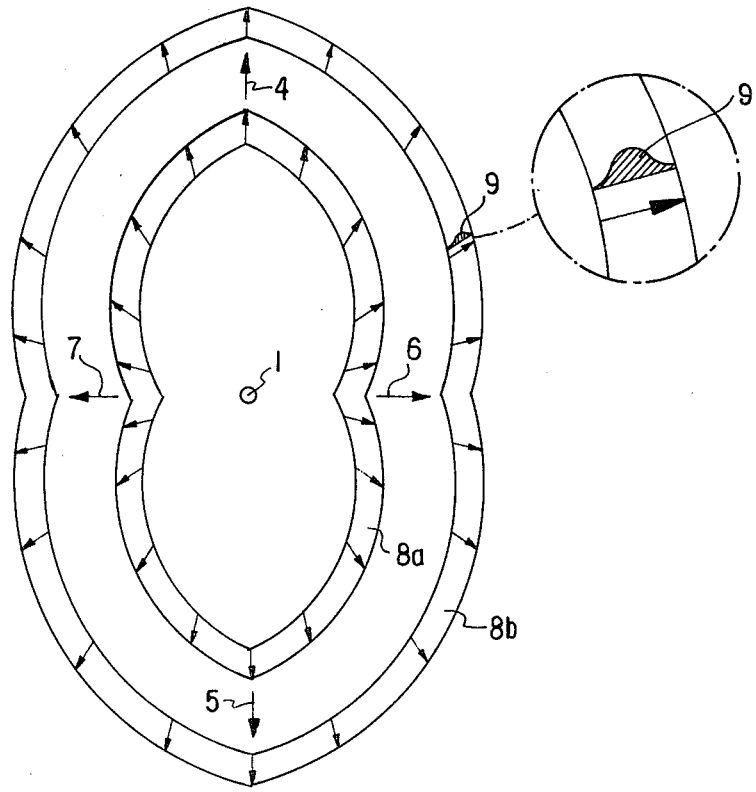
FIG. 3

SONAR SYSTEM

BACKGROUND OF THE INVENTION

The present invention relates to a sonar system with a transmitting arrangement for simultaneously pivoting or sweeping a plurality of transmitting directional characteristics in adjacent sectors of an observation range.

Sonar systems in which a high transmitting level of sound is obtained by bundling the transmitting power emitted by a group of electroacoustical transducers into a narrow directional characteristic which is pivoted or swept, intermittently or continuously, over the observation area of interest are known in the art. This method of sound transmission is referred to in the art literature as the rotational directional transmission or RDT method.

In an existing sonar system employing this principle, three transmitting directional characteristics are produced which are offset with respect to one another by 120° each in the manner of a star and which emit sound while being simultaneously swept over a respective sector of 120° so that the entire circle of 360° is covered.

The advantage of the RDT method is that bundling of the transmitting power results in a high transmission level — and thus a correspondingly wide range — and that at the same time a wide observation sector can be sounded within a short period of time.

To achieve these advantages, several drawbacks must be taken into account in the RDT method. Since the transmitting directional characteristics cover their assigned sector in a finite time period, echo pulses from different equidistant targets distributed over a sector arrive with a delay determined by the pivoting or sweeping speed. These targets are then displayed on the conventional PPI (Plan Position Indicator) display not on a circular arc but with a spiral-shaped distortion corresponding to the differing arrival times of the echo pulses.

This spiral-shaped distoration has a particularly unfavorable effect in an RDT method system utilizing a plurality of simultaneously transmitting directional characteristics when a target lies in the overlapping range of two adjacent transmitting directional characteristics. In such a system, a target so located will be displayed by two separately illuminated dots, one lying behind the other with the inner dot being produced by an echo from one of the transmitting directional characteristics at the beginning of the transmitting period and the outer dot by an echo from the adjacent characteristic at the end of the transmitting period.

To compensate for the distance errors caused by the finite duration of the pivoting movement, special compensation devices are required. This compensation, however, becomes particularly difficult due to the above-described double display of a target disposed in a zone of overlap between two adjacent transmitting sectors.

Such double displays can be avoided, as proposed in German Pat. application P 17 66 751.5 or U.S. Pat. application Ser. No. 842,112 filed July 16, 1969, now Pat. No. 3,609,673 by providing a stepwise switching or sweep direction for the transmitting directional characteristics within their respective assigned transmitting sector.

Each transmitting sector is here divided into n partial sectors each of which has the width of the transmitting directional characteristic. Within each transmitting period the transmitting directional characteristics are now switched, beginning in the vicinity of their center position at $n/2$, in rapid succession to $n/2 + 1$, $n/2 - 1$, $n/2 + 2$ . . . until they reach the edges of their respective sectors. Coarse double displays are thus avoided and the PPI image becomes almost unambiguous because double echoes can have only very slight distances from one another.

One particular drawback, however, of such a system, which drawback is inherent to all irregularly pivoting or sweeping transmitting methods in the ranging art, is that they radiate a relatively broad spectrum whose half-value width corresponds to the inverse of the period of dwell of the transmitting directional characteristic in one direction.

SUMMARY OF THE INVENTION

It is therefore the object of the present invention to provide a sonar system which avoids the above-described drawbacks of the known sonar devices while still realizing the advantages resulting from the simultaneous sweeping of a plurality of transmitting directional characteristics in adjacent sectors of a large observation area.

This is accomplished according to the present invention in that in a sonar system wherein the transmitting directional characteristics of a plurality of bundled beams of acoustical energy are simultaneously swept or pivoted over respective adjacent sectors of the area of observation, the transmitting directional characteristics of each pair of adjacent sectors are monotonously moved over the respective sectors in opposite directions so that they leave or reach the common borders of these sectors at the same time.

Sweeping or pivoting the transmitting directional characteristic in this manner results in an unambiguous display of targets even in the areas of the sector edges and the transmitting spectrum is no longer undesirably broadened by sudden pivoting. The transmitting spectrum now corresponds to the shape of a pulse which is a reproduction of the transmitting direction characteristic with respect to time.

BRIEF DESCRIPTION OF THE DRAWINGS

FIG. 1 illustrates the principle of a sonar base having transmitting directional characteristics in pivotal operation and is utilized in explaining the invention.

FIGS. 2a–2e show the pivotal transmitting directional characteristics at different points in time during one pivoting movement according to the invention.

FIG. 3 is a schematic illustration of the distribution and propagation of the radiated energy in the medium during one transmitting period according to the invention and at two different points in time.

DESCRIPTION OF THE PREFERRED EMBODIMENTS

Figure 4:
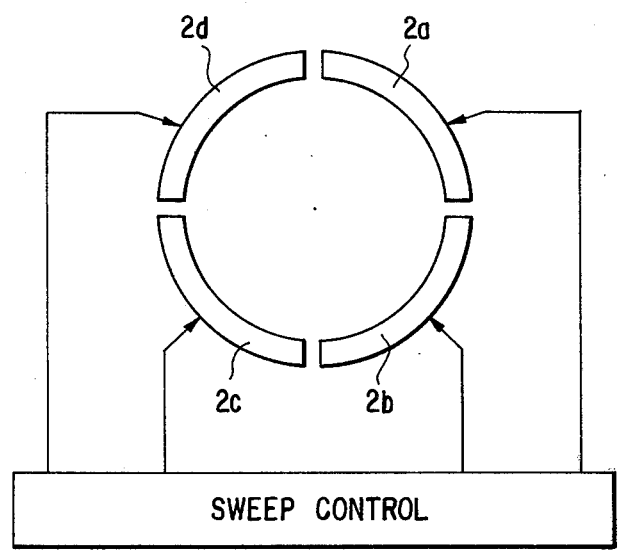
FIG. 4 shows the four transducer groups of the base connected to means to control the sweep of the characteristics.

FIG. 1 shows a cylindrical sonar transducer base 1 which is divided into an even number of equal sectors of angle $\theta$. In the figure the base 1 is divided into four sectors of 90° each. Each sector has assigned to it one of the four resonator or transducer groups 2a, 2b, 2c, 2d. Each of the transducer groups 2a . . . 2d consists of the same number of electroacoustical transducers (not shown) which are arranged in a plurality of rows on top and next to one another in a rotationally symmetrical design around the axis of the cylindrical base 1 in a manner known in the art.

The individual transducers of each group are excited in a manner to provide sharp bundling of the resulting transmitting directional characteristic. The manner of causing the sharp bundling of the transmitting directional characteristic 3 during emission from transducer groups arranged in cylindrical sectors by the excitation thereof with partial voltages which are phase shifted with respect to one another is known in the art.

Means are further known for continuously controlling the emission direction of a transducer group, i.e. by a continuous change in the phase shift between the individual excitation voltages. Such means are for example shown in the U.S. Pat. No. 2,925,581 where they are used to pivote three directional characteristics in a manner being state of the art.

In the illustrated embodiment of the present invention the transmitting acoustical power emitted by each of the transducer groups 2a to 2d is bundled into four narrow transmitting directional characteristics 3a–3d, respectively, which are pivoted over their respective sectors by means of the above-mentioned general prior art method. According to the invention, however, the sweeping or pivoting of the transmitting directional characteristics is controlled so that the transmitting directional characteristics in each pair of adjacent sectors are pivoted in a monotonous, continuous manner in opposite directions so that the directional characteristics reach and leave the common borderline between the respective sectors at the same instant of time. That is, during each transmitting period, the transmitting directional characteristic 3a is here pivoted in a direction from 4 to 6, and characteristic 3c is pivoted in a direction from 5 to 7, both clockwise, while the characteristic 3b is pivoted in a direction from 5 to 6, and 3d from 4 to 7, in counterclockwise movement.

While FIG. 1 shows the cylindrical base 1 with its division into transducer groups 2a . . . 2d, it can only indicate schematically the pivoting of the transmitting directional characteristics 3a–3d. FIG. 2, however, shows the four transmitting directional characteristics 3a–3d as radiation diagrams at five different points in time within one transmitting period.

FIG. 2a shows the beginning of a transmitting period where transmitting directional characteristics 3a and 3d coincide in direction 4 and characteristics 3b and 3c coincide in direction 5. A short time later, as shown in FIG. 2b, the characteristics 3a and 3d begin to separate as do 3b and 3c.

FIG. 2c shows the transmitting state after exactly one-half a transmitting period where all characteristics 3a–3d have reached the center of their respective sectors.

In the transmitting state illustrated in FIG. 3d, the characteristics 3a and 3b and the characteristics 3c and 3d begin to come together and finally, as shown in FIG. 2e, at the end of the transmitting period and at the end of the pivoting movement, characteristics 3a and 3b from a common main lobe in direction 6 as do characteristics 3c and 3d in direction 7.

This pivoting process for the transmitting directional characteristics 3a–3d shown in five individual phases within one transmitting period takes place monotonously, continuously and in a very short time in order to be able to switch the transducer groups 2a–2d as quickly as possible to the reception of echo signals.

During the entire transmitting period, the products of the pivoting or sweeping speed and the aperture angle $\phi$ (FIG. 2a) are maintained constant.

FIG. 3 shows a horizontal section through the medium surrounding the cylindrical base 1 and the propagation of the sound energy field at two different points in time after completion of the transmitting period. The emitted sound energy is radially propagated from the cylindrical base 1 as its common point of origin.

The approximately figure-eight inner display 8a shows the sound energy field a short time after completion of a transmission period. A short time later the propagation of the sound energy field assumes a more circular shape 8b.

The shape of the sound energy field, i.e. 8a or 8b, at different points in time during the propagation is determined by the duration of one pivoting movement of the transmission lobe or directional characteristic. A bell-shaped distribution of the energy density 9, as is shown schematically as a section through the sound energy field 8b, represents a reproduction of the energy distribution of the radiation diagram of the individual transducer groups 2a–2d.

The great advantage of the monotonous pivoting of the transmitting directional characteristics 3a–3d in the manner of the present invention is that a sound energy field 8 is caused to propagate which is closed at all sides. Each target present in the observation area can thus be hit by the sound only once within each transmitting period and can thus produce only a single echo pulse. The echo time measurement thus becomes unambiguous.

A further advantage of the monotonous pivoting according to the present invention of the transmitting directional characteristics 3a–3d in a continuous sweep is that their spectrum is extremely narrow-banded in the described bell-shaped distribution of the energy density 9. This narrow-bandedness is desirable and is a favorable factor, inter alia, in the Doppler measurement.

It should be understood that the present invention is not limited to a sonar system with a cylindrical base 1 as it is shown in the selected embodiment. For example, the transducer groups 2a–2d may also be provided in the form of individual surfaces, an even number of which are combined into a regular prism.

FIG. 4 illustrates the principle connection between the four transducer groups 2a, 2b, 2b, 2c, 2d according to the illustrated embodiment of the invention, connected to a means 10 for controlling the sweep as is known in the art and whose function has been referred to above. This sweep control means 10 controls the four transmitting directional characteristics 3a, 3b, 3c, 3d to pivot same in a manner explained in detail above with regard to FIGS. 2a–2e.

It will be understood that the above description of the present invention is susceptible to various modifications, changes and adaptations and the same are intended to be comprehended within the meaning and range of equivalents of the appended claims.

We claim:

1. In a sonar system having a transmitting arrangement for the simultaneous sweeping of a plurality of transmitting directional characteristics in respective adjacent sectors of an observation area, the improvement comprising: means for causing the transmitting directional characteristics in each pair of adjacent sectors to sweep over their respective sectors in a continuous manner and in opposite directions so that the respective transmitting directional characteristics leave and reach the common borderline of the sectors at the same time.

2. A sonar system as defined in claim 1 wherein said transmitting arrangement includes a radially symmetrical group of transducers formed from a plurality of partial transducer groups of identical construction, each of said partial transducer groups producing one of said transmitting directional characteristics.

3. A sonar system as defined in claim 2 wherein the outer surfaces of said partial transducer groups are disposed on a common cylindrical surface.

4. A sonar system as defined in claim 2 wherein said partial transducer groups have planar outer surfaces which are arranged to form a regular prism.

5. A sonar system as defined in claim 1 wherein the products of the sweeping speed and the aperture angle of the transmitting directional characteristics are constant during the entire transmitting period.

6. In a method of transmitting sonar energy wherein the transmitting directional characteristics of a plurality of bundled beams of acoustical energy are simultaneously pivoted over respective adjacent sectors of an observation area, the improvement comprising: pivoting the transmitting directional characteristics in each pair of adjacent sectors in a continuous manner and in opposite directions so that the respective transmitting directional characteristics leave and reach the common borderline of the sectors at the same time.

7. The method defined in claim 6 wherein the products of the sweeping speed and the aperture angle of the transmitting directional characteristics are constant during the entire transmitting period.

* * * * *